United States Patent [19]

Lee et al.

[11] Patent Number: 5,035,475
[45] Date of Patent: Jul. 30, 1991

[54] UNIQUE MODULATION TELEVISION

[75] Inventors: Yeon H. Lee, Los Angeles; Gregory Um, Torrance, both of Calif.

[73] Assignee: Aura Systems, Inc., El Segundo, Calif.

[21] Appl. No.: 478,139

[22] Filed: Mar. 15, 1990

[51] Int. Cl.$^5$ ............................................. G02B 26/08
[52] U.S. Cl. ....................................... 350/6.5; 350/171; 350/172; 350/626; 340/796; 358/63; 358/231
[58] Field of Search ..................... 350/6.5, 6.7, 6.91, 350/169, 171, 172, 615, 626; 358/63, 231, 234, 249; 390/795, 796

[56] References Cited

U.S. PATENT DOCUMENTS

| | | | |
|---|---|---|---|
| 4,797,696 | 1/1989 | Allen et al. | 350/172 |
| 4,915,486 | 4/1990 | Hansen | 350/171 |

Primary Examiner—Bruce Y. Arnold
Assistant Examiner—J. P. Ryan
Attorney, Agent, or Firm—Poms, Smith, Lande & Rose

[57] ABSTRACT

A video display system includes a source of optical energy, a beam splitter, a baffle, an MxN array of mirrors and a screen. The source develops the first light beam along a first propagation path. The beam splitter is disposed in this first propagation path. The beam splitter is positioned to split the optical energy of the first light beam to develop a second light beam along a second propagation path. The baffle has a first face, a second face and a row of parallel slits. The slits are open between the first face and the second face and may extend either vertically or horizontally across each face of the baffle. Accordingly, there are either M rows or N columns of slits. The baffle is disposed in the second propagation path so that the second light beam illuminates the first face and passes through the slits to exit from the second face as a plurality of planar light beams along the second propagation path. The mirror array is disposed in a facing relationship to the second face of the baffle. Each row or column of the mirrors has an optically reflective surface in optical alignment with a respective one of the slits. Each mirror reflects a portion of the planar light beam incident thereon through the respective one of the slits to develop a plurality of pixel light beams exiting the apertures from the first face along the second propagation path.

24 Claims, 2 Drawing Sheets

UNIQUE MODULATION TELEVISION

RELATED APPLICATION DATA

The following disclosure is related to the disclosure of the commonly owned application, Ser. No. 07/494,579, filed Mar. 16, 1990.

FIELD OF THE INVENTION

The present invention relates generally to video display systems and more particularly to a novel video projection system.

BACKGROUND OF THE INVENTION

Video display systems generally display an image as an M×N array of pixels. In one particular class of video display systems, known as optical projection systems, one or more beams of light are modulated in accordance with electrical signals received from an electronic controller. In the case of a single modulated beam, the beam is scanned horizontally in successive lines on a screen to develop the image. With multiple modulated beams, each beam may be used to scan one row, respectively, in the image. The multiple beams would be simultaneously scanned horizontally across the screen. During the horizontal scanning, the beam intensity in each beam is modulated for each column of pixels to form the image.

A multiple beam system is disclosed in copending, commonly owned application, Ser. No. 429,987, filed Nov. 1, 1989, entitled "UNIQUE MODULATION TELEVISION." The disclosed multiple beam system includes an M×1 mirror array where M is equal to the number of horizontal lines in the pixel array. The mirrors in the array are pivotally mounted along one of their edges to a base plate. Mounted to an opposite edge of each mirror and also to the base plate is a piezoelectric crystal, such that there is one piezoelectric crystal for each mirror. The mirror array is uniformly illuminated and the reflected light beam from each mirror is incident upon a slit. By applying electrical signals to the piezoelectric crystals, the position of each of the mirrors is altered, thereby causing a slight deviation in the path of each of the reflected beams. As the path of each beam is changed, the amount of light from each beam which passes through the slit is modulated, thereby modulating the intensity of the beam. Each modulated beam is then incident upon a rotating polygonal mirror which horizontally sweeps each of the beams across the screen. As the beams are being horizontally swept, the electrical signals to each of the piezoelectric crystals may be changing to vary the intensity for each column of pixels in the resultant displayed image. As disclosed in this prior filed application, the electrical signals are exemplarily provided by clocking data from a bit mapped memory, wherein the data clock is synchronous with the scan rate in the pixel array.

The rotating mirror which provides the horizontal sweep may be eliminated by providing an M×N mirror array. The reflected beam from each mirror is used to develop each pixel in the displayed M×N raster. An example of a video display system using an M×N mirror ray is disclosed in copending commonly owned application, Ser. No. 448,748, filed Dec. 11, 1989, entitled "UNIQUE MODULATION TELEVISION." Similarly to the system disclosed in the above mentioned prior filed application, each beam is modulated by applying an electric signal to each piezoelectric crystal under each mirror.

SUMMARY OF THE INVENTION

In the following specification, another type of video display projection system is disclosed. The video display system will display an image as an M×N array of pixels.

According to the present invention, the video display system includes a source of optical energy, a beam splitter, a baffle, an M×N array of mirrors and a screen. The source develops the first light beam along a first propagation path. The beam splitter is disposed in this first propagation path. The beam splitter is positioned to split the optical energy of the first light beam to develop a second light beam along a second propagation bath. The baffle has a first face, a second face and a row of parallel slits. The slits are open between the first face and the second face and may extend either vertically or horizontally across each face of the baffle. Accordingly, there are either M rows or N columns of slits. The baffle is disposed in the second propagation path so that the second light beam illuminates the first face and passes through the slits to exit from the second face as a plurality of planar light beams along the second propagation path. The mirror array is disposed in a facing relationship to the second face of the baffle. Each row or column of the mirrors has an optically reflective surface in optical alignment with a respective one of the slits. Each mirror reflects a portion of the planar light beam incident thereon through the respective one of the slits to develop a plurality of pixel light beams exiting the apertures from the first face along the second propagation path. Each of the mirrors is movable to perturb a respective one of the pixel light beams propagating therefrom from alignment with the second propagation path. This perturbation is transverse to the slits and thereby selectively attenuates the optical energy of the respective one of the pixel beams when propagating through the respective one of the slits. The screen is disposed in the second propagation path with the beam splitter intermediate the baffle and the screen. The pixel beams illuminate the screen to display the image.

In another aspect of the present invention, a further baffle and an array of mirrors may be disposed in the first propagation path distal from the beam splitter to modulate the intensity of the beams passing through the beam splitter in the first propagation path. The second baffle and second mirror array function similarly to the similar components described hereinabove.

The present invention may also be embodied as a Schlieren video display system.

An advantage of the present invention through the display systems disclosed in the above mentioned copending applications is that the present invention is of more compact design. These and other objects, advantages and features of the present invention will become readily apparent to those skilled in the art from a study of the following description of an exemplary preferred embodiment when read in conjunction with the attached drawings and appended claims.

DESCRIPTION OF AN EXEMPLARY PREFERRED EMBODIMENT

Figure 1:
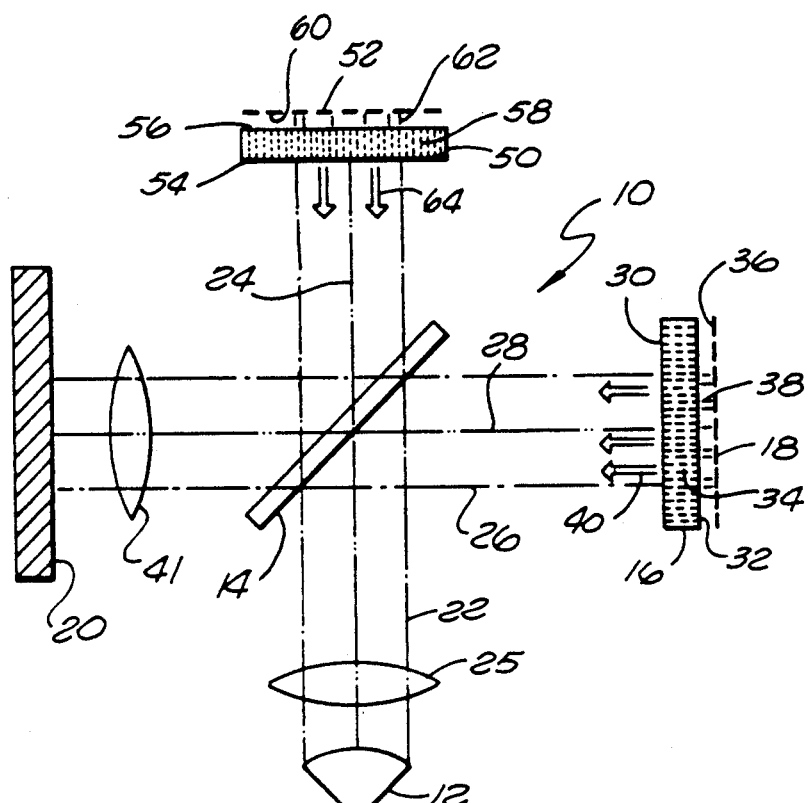
FIG. 1 is a schematic diagram of a video display system constructed according to the principles of the present invention.
Figure 2:
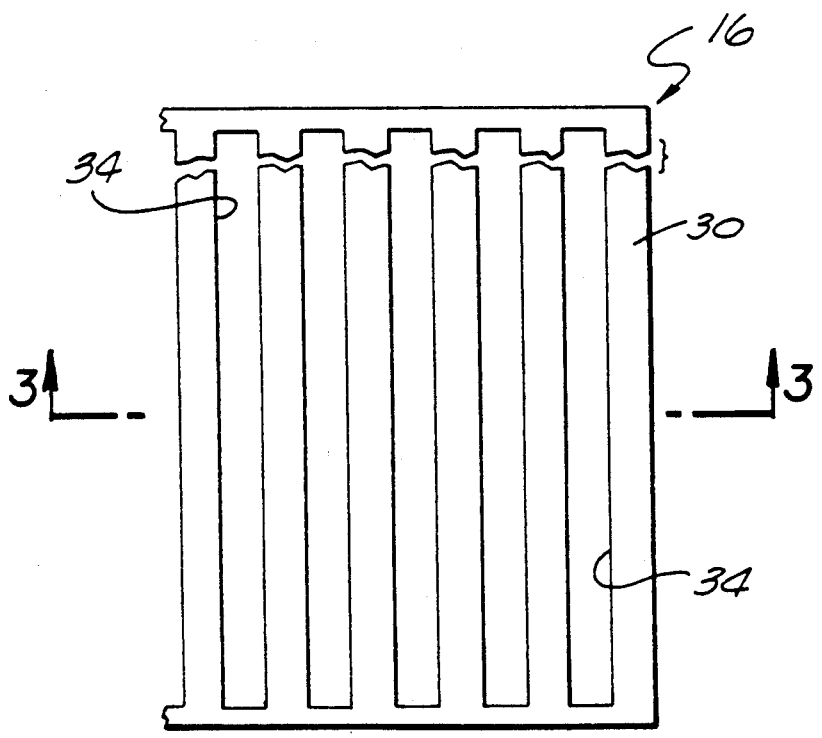
FIG. 2 is a plan view, broken away, of a portion of FIG. 1.

Referring now to FIGS. 1-3, there is shown a video display system 10 to display an image as an M×N array of pixels. The display system 10 includes a source 12 of optical energy, a beam splitter 14, a baffle 16, an M×N array of mirrors 18, and a screen 20.

The source 12 of optical energy develops a first light beam 22. The first light beam 22 propagates along a first propagation path 24. A collimating lens 25 may be disposed between the source 12 and beam splitter 14. The beam splitter 14 is disposed in the first propagation path 24. The beam splitter 14 is positioned to split the optical energy of the first light beam 22 to develop a second light beam 26 along a second propagation path 28. The second light beam 26 propagates toward the baffle 16.

The baffle 16 has a first face 30, a second face 32, and N columns of slits 34. It will become apparent from the following description that the baffle 16 may, alternatively, have M rows of slits 34. The slits 34 are open between the first face 30 and the second face 32 and extend vertically across each face. The M×N array of mirrors 18 is disposed in a facing relationship to the second face 32 of the baffle 16. Each column of the mirrors 18 has an optically reflective surface 36 in optical alignment with the respective one of the slits 34. The screen 20 is disposed in the second propagation path 28 and is positioned with the beam splitter 14 being intermediate the baffle 16 and the screen 20.

The baffle 16 is disposed in the second propagation path 26 so that the second light beam 26 illuminates the first face 30 thereof. The second light beam 26 passes through the slits 34 and exits from the second face 32 as a plurality of planar light beams 38 along the second propagation path 28.

Each of the mirrors 18 reflects a portion of one of the planar light beams incident thereon which exits from a respective one of the slits 34. The reflected beam is reflected back through the respective one of the slits 34 to develop a plurality of pixel light beams 40. The pixel light beams 40 exit the apertures 34 from the first face 30 along the second propagation path 28. Each of the mirrors 18 is movable to perturb a respective one of the pixel light beams 40 propagating therefrom. The perturbation being transverse to the respective slit 34 perturbs the alignment of the respective one of the pixel light beams 40 with respect to the second propagation path 28. The perturbation selectively attenuates the optical energy of the respective one of the pixel light beams 40 when propagating through the respective one of the slits 34. The pixel light beams 40 propagate through the beam splitter 14 and are incident on the screen 20. A projection lens 41 may be positioned between the beam splitter 14 and screen 20. Therefore, the pixel beams 40 illuminate the screen 20 to display the image.

Figure 3A:
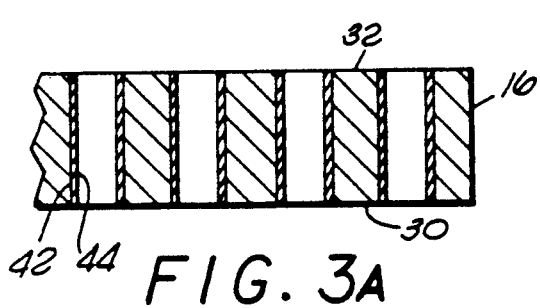
FIG. 3 is a view taken along line 3—3 of FIG. 2.
Figure 3B:
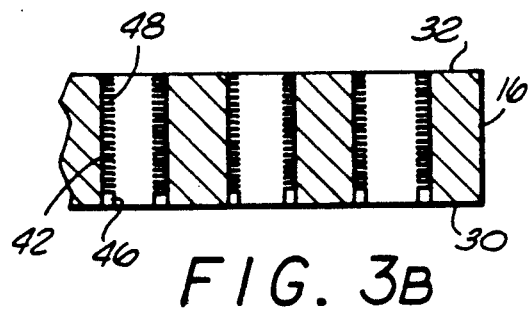

The perturbation of the alignment of the pixel light beams 40 from alignment with the second propagation path 28 causes the beams to be incident on the walls 42 of the slits 34 through which each pixel light beam 40 passes. Accordingly, each of the slits 34 may have an anti-reflective coating 44 disposed on the walls 42, as best seen in FIG. 3a. The anti-reflective coating absorbs the optical energy, preventing such energy from being reflected off opposing walls and exiting the slits 34 at the first face 30. To further trap the optical energy, each of the slits 34 may include a lip 46 extending slightly therein, as seen in FIG. 3b. The lip 46 is generally in the plane of the first face 30.

Alternatively, as best seen in FIG. 3b, the walls 42 of each of the apertures 34 may have an anti-reflective surface 48. The anti-reflective surface 48 may be in the form of a feathering which may be formed by etching the surface, roughing it to disperse any optical energy incident thereon.

Each time optical energy passes through the beam splitter 14, a portion of the energy propagates along the same propagation path and is split along the other propagation path. For example, when the first light beam 22 is incident on the beam splitter 14, a portion of its optical energy is developed as the second light beam 26 along the second propagation path 28. The remaining portion of the optical energy of the first light beam 22 continues to propagate along the first propagation path 24 subsequent to the beam splitter 14.

To utilize this optical energy which may otherwise be lost, the video system 10 further comprises a second baffle 50 and an M×N array of second mirrors 52. Similar in construction to the first baffle 16, the second baffle 50 has a first face 54, a second face 56 and N columns of second slits 58. The second slits 58 extend between the first face 54 and the second face 56 of the second baffle 50. Similarly to the first mirrors 18, the M×N array of second mirrors 52 is disposed in a facing relationship to the second face 56 of the second baffle 50. Each column of the second mirrors 52 has an optically reflective surface 60 in optical alignment with the respective one of the second slits 58.

The operation of the second baffle 50 and second mirrors 52 is identical to that of the first baffle 16 and the first mirrors 18. The second baffle 50 is disposed in the first propagation path 24 with the beam splitter 14 disposed intermediate the second baffle 50 and the source 12 of optical energy. The optical energy of the first light beam 26 which passes through the beam splitter 14 illuminates the first face 54 of the second baffle 50 and passes through the second slits 58. This light energy then exits from the second face 56 of the second baffle 50 as a plurality of second planar light beams 62. Each of the second mirrors 52 reflects one of the second planar light beams 62 incident thereon through the respective one of the second slits 58 to develop a plurality of second pixel light beams 64 exiting the respective one of the second slits 58. The second pixel light beams 64 exit from the first face 54 of the second baffle 50 along the first propagation path 24. Each of the second mirrors 52 is movable to perturb a respective one of the second pixel light beams 64 propagating therefrom from alignment with the first propagation path 24. This perturbation being transverse to the second slits 58 selectively attenuates the optical energy of the respective one of the second pixel light beams 64 when propagating through the respective one of the second slits 58. Furthermore, each of the second mirrors 52 is movable commensurately with a respective one of the first mirrors 18 so that the optical energy of each of the second pixel beams 64, when incident on the beam splitter 14, is split along the second propagation path 28 to be combined cumulatively with the optical energy of a respective one of the first pixel beams 40. This requires each of the first slits 34 to be optically aligned with a respective one of the second slits 58 so that optical energy from each is combined at the beam splitter 14.

However, the second slits 58 may be offset from the first slits 34. Instead of the optical energy being combined at the beam splitter 14, the energy is projected to the screen 20 as interleaved rows (2M×N pixels in the screen) or columns (M×2N Pixels in the screen). Accordingly, each of the second mirrors 52 may operate independently of a respective one of the first mirrors 18.

The construction of the second baffle 50 is identical to the construction of the first baffle 16. Therefore, the above description with respect to FIGS. 3a and 3b is also applicable to the description of the second baffle 50. Each of the first baffle 16 and second baffle 50 may have a thickness of approximately 10 cm between their respective faces.

Figure 4:
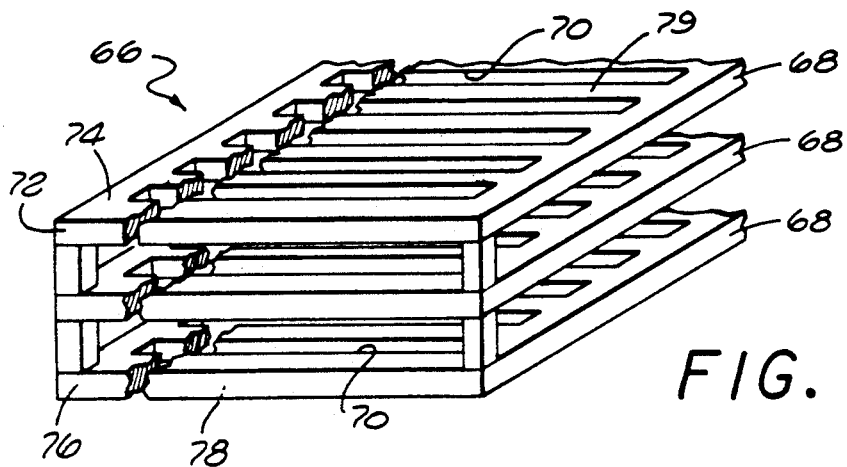
FIG. 4 is a perspective view, broken away, of an alternative embodiment of the baffle shown in FIG. 1.

Referring now to FIG. 4, there is shown an alternative baffle 66 which may be used in place of the first baffle 16 and second baffle 50. Instead of being a solid block of opaque material as the first baffle 16 and second baffle 50, the baffle 66 includes a plurality of spaced apart plates 68. Each of the plates 68 has M rows (or N columns) of slits 70 in alignment with the slits 70 of the other plates 68. The first end one 72 of the plates 68 forms a first face 74 of the baffle 66 and a second end one 76 of the plates 68 forms a second face 78 of the baffle 66. The baffle 66 is disposed in the appropriate one of the first propagation path 24 and second propagation path 26 as hereinabove described. The reflected pixel light beams 40, 64, instead of being absorbed by slit walls, pass through each of the slits 70 and, if not in alignment with the respective propagation path, will be incident on an obfuscation 79 adjacent the slits 70, thereby absorbing a portion of the optical energy of the pixel light beams 40, 64. Otherwise, the use of the baffle 66 in place of the first baffle 16 or second baffle 50 does not change the operation of the video system 10.

Figure 5:
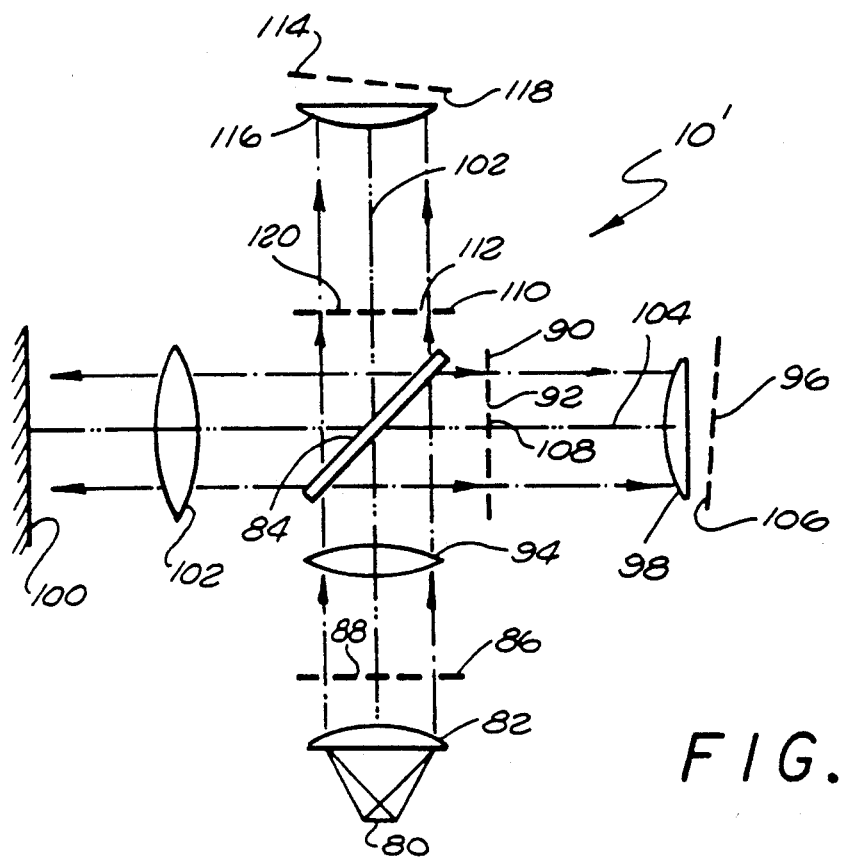
FIG. 5 is another embodiment of a video display system constructed according to the principles of the present invention.

With reference now to FIG. 5, there is shown an alternative video display system 10'. The above-described video system 10 is a non-Schlieren device. The video system 10' includes a source 80 of optical energy, a first lens 82, a beam splitter 84, a first array 86 of K columns of first slits 88, a second array 90 of K columns of second slits 92, a second lens 94, a first M×N array of first mirrors 96, a third lens 98, a screen 100 and a fourth lens 103.

The first lens 82 quasi collimates the optical energy emitted from the non-point source 80 along a first propagation path 102. The beam splitter 84 is disposed in the first propagation path 102 and is positioned to split a portion of the collimated optical energy along a second propagation path 104. The first arraY 86 is disposed in the first optical path 102 and the second array 90 is disposed in the second optical path 104.

The second lens 94 is disposed in the first optical path 102 intermediate the first array 86 and the beam splitter 84. The second lens 94 is positioned to image each of the first slits 88 into a respective one of the second slits 92.

The M×N array of first mirrors 96 is disposed in the second optical path 104 with the second array 90 being intermediate the beam splitter 84 and the mirrors 96. Each column of the mirrors 96 has reflective surfaces 106 which are uniformly illuminated by the second array 90 of K columns of second slits 92 via divergence of beams after the second slits 92 due to the non-point source 80. The array of mirrors 96 is offset from orthogonal alignment with the second propagation path 104.

The third lens 98 is disposed on the second propagation path 104 intermediate the second array 90 and the mirrors 96. Through the offset alignment, the third lens 98 images one of the second slits 92 to an obfuscation 108. Each of the mirrors 96 is movable to image a selected portion of the reflection to the respective one of the second slits 92. The screen 100 is disposed in the second propagation path 104 with the beam splitter 84 intermediate the screen 100 and the second array 90. The fourth lens 103 is also disposed on the second propagation path 104 intermediate the screen 100 and the beam splitter 84. The second lens 104 images the selected portion of the reflection visible through the second slits 92 to the screen 100 thereby displaying an image. Therefore, it is seen to those skilled in the art that the operation of the Schlieren video system 10' has some communality to the video display system 10 described with reference to FIG. 1 in that a first light beam is split to develop a second light beam and the second light beam being first split into a plurality of parallel light beams which are reflected as pixel beams. Again the slits may be arranged in K rows, whose number is determined such that the slit array 90 uniformly illuminate the mirror array 96.

To recover optical energy which may otherwise be lost, the video system 10' of FIG. 5 further includes a third array 110 of K columns of third slits 112, a second M×N array of second mirrors 114 and a fifth lens 116. The third array 110 is disposed in the first optical path 102 with the beam splitter 84 being intermediate the third array 110 and the second lens 94. The second M×N array of second mirrors 114 is disposed in the first optical path 102 with the third array 110 being intermediate the second array of second mirrors 114 and the beam splitter 84. The fifth lens 116 is disposed in the first propagation path 102 intermediate the third array 110 and the second mirrors 114.

Each column of the second mirrors 114 has reflective surfaces 118 which are uniformly illuminated by the third array 110 via divergence of beams after the third slits 112 due to the non-profit source 80. Similarly, the second array of second mirrors 114 is offset from orthogonal alignment with the first propagation path 102. The fifth lens 116 images, because of this offset, one of the third slits 112 to an obfuscation 120. Each of the second mirrors 114 is movable to image a selected portion of the second reflection to the respective one of the third slits 112. The fifth lens 116 images the selected portion of the second reflection to the screen 100. Each of the second mirrors 114 is movable commensurately with the respective one of the first mirrors 96 whereby the first reflection is cumulatively combined with the second reflection at the beam splitter 84.

The second mirrors 114 can be offset horizontally from the first mirrors 96 if there is dead space between columns of the mirrors 114 and columns of the mirrors 96, and if the number of slits in the first slit array 86, second slit array 90 and the third slit array 110 is properly chosen. Again the slits may be arranged in K rows.

There has been described hereinabove several embodiments of a novel video display system. Those skilled in the art may now make numerous uses of and departures from the above-described exemplary preferred embodiments without departing from the inventive concepts disclosed herein. Accordingly, the present invention is to be defined solely by the scope of the following claims:

What is claimed is:

1. An optical modulation video system to display an image as an M×N array of pixels, said system comprising:
   a source of optical energy to develop a first light beam along a first propagation path;
   a beam splitter disposed in said first propagation path and positioned to split said optical energy of said first light beam to develop a second light beam along a second propagation path;
   a first baffle having a first face, a second face, and N columns of slits open between said first face and said second face, said baffle being disposed in said second propagation path so that said second light beam illuminates said first face and passes through said slits to exit from said second face as a plurality of planar light beams along said second propagation path;
   an M×N array of first mirrors disposed in a facing relationship to said second face of said baffle, each column of said mirrors having an optically reflective surface in optical alignment with a respective one of said slits to reflect one of said planar light beams incident thereon through said respective one of said slits to develop a plurality of pixel light beams exiting said slits from said first face along said second propagation path, each of said mirrors being movable to perturb a respective one of said pixel light beams propagating therefrom from alignment with said second propagation path to attenuate selectively said optical energy of said respective one of said pixel beams when propagating through said respective one of said slits; and
   a screen disposed in said second propagation path and positioned wherein said beam splitter is intermediate said baffle and said screen, whereby said pixel beams illuminate said screen to display said image.

2. A video display system as set forth in claim 1 wherein said slits have an anti-reflective coating disposed on the walls thereof.

3. A video system as set forth in claim 1 wherein each of said slits generally includes a lip extending slightly therein, said lip being generally in the plane of said first face.

4. A video system as set forth in claim 1 wherein said baffle has a thickness of approximately 10 cm.

5. A video system as set forth in claim 1 wherein the walls of said slits have an anti-reflective surface.

6. A video system as set forth in claim 1 further comprising:
   a second baffle having a first face, a second face and N columns of second slits open between said first face and said second face, said second baffle being disposed in said first propagation path wherein said beam splitter is disposed intermediate said second baffle and said source so that said optical energy of said first light beam illuminates said first face of said second baffle and passes through said second slits to exit from said second face of said second baffle as a plurality of second planar light beams; and
   an M×N array of second mirrors disposed in a facing relationship to said second face of said second baffle, each column of said second mirrors having an optically reflective surface in optical alignment with a respective one of said second slits to reflect one of said second planar light beams incident thereon through said respective one of said second slits to develop a plurality of second pixel light beams exiting said second slit from said first face of said second baffle along said first propagation path, each of said second mirrors being movable to perturb a respective one of said second pixel light beams propagating therefrom from alignment with said first propagation path to attenuate selectively said optical energy of said respective one of said second pixel beams when propagating through said respective one of said second slits, each of said second mirrors being moved commensurately with a respective one of said first mirrors so that said optical energy of each of said second pixel beams when incident on said beam splitter is split whereby a portion of said optical energy of each of said second pixel beams cumulatively combines with said optical energy of a respective one of said first pixel beams.

7. A video system as set forth in claim 6 wherein said second slit have an anti-reflective coating disposed on the walls thereof.

8. A video system as set forth in claim 6 wherein each of said second slits generally includes a lip extending slightly therein, said lip being generally in the plane of said first face of said second baffle.

9. A video system as set forth in claim 6 wherein said second baffle has a thickness of approximately 10 cm.

10. A video system as set forth in claim 6 wherein the walls of said second slits have an anti-reflective surface.

11. A video system as set forth in claim 1 further comprising:
   a second baffle having a first face, a second face and N columns of second slits open between said first face and said second face, said second baffle being disposed in said first propagation path wherein said beam splitter is disposed intermediate said second baffle and said source so that said optical energy of said first light beam illuminates said first face of said second baffle and passes through said second slits to exit from said second face of said second baffle as a plurality of second planar light beams; and
   an M×N array of second mirrors disposed in a facing relationship to said second face of said second baffle, each column of said second mirrors having an optically reflective surface in optical alignment with a respective one of said second slits to reflect one of said second planar light beams incident thereon through said respective one of said second slits to develop a plurality of second pixel light beams exiting said second slit from said first face of said second baffle along said first propagation path, each of said second mirrors being movable to perturb a respective one of said second pixel light beams propagating therefrom from alignment with said first propagation path to attenuate selectively said optical energy of said respective one of said second pixel beams when propagating through said respective one of said second slits, each of said second slits being optically offset from respective one of said first slits so that said second pixel beams in each column interleave with said first pixel beams of an adjacent column on said screen.

12. An optical modulation video system to display an image as an M×N array of pixels, said system comprising:

a source of optical energy to develop a first light beam along a first propagation path;

a beam splitter disposed on said first propagation path and positioned to split said optical energy of said first light beam to develop a second light beam along a second propagation path;

a first baffle including a plurality of spaced-apart plates, each of said plates having N columns of first slits in alignment with said first slits of each other of said plates, a first end one of said plates forming a first face of said first baffle and a second end one of said plates forming a second face of said first baffle, said first baffle being disposed in said second propagation path so that said second light beam illuminates said first face and passes through said slits to exit from said second face as a plurality of planar light beams along said second propagation path;

an M×N array of first mirrors disposed in a facing relationship to said second face of said first baffle, each column of said mirrors having an optically reflective surface in optical alignment with a respective one of said first slits in each of said plates to reflect one of said parallel light beams incident thereon through said respective one of said slits to develop a plurality of pixel light beams exiting said slits from said first face along said second propagation path, each of said mirrors being movable to perturb a respective one of said pixel light beams propagating therefrom from alignment with said second propagation path to attenuate selectively said optical energy of said respective one of said pixel beams when propagating through said respective one of said slits of each of said plates; and a screen disposed in said second propagation path and positioned wherein said beam splitter is disposed intermediate said baffle and said screen so that said pixel beams illuminate said screen to display said image.

13. A video system as set forth in claim 12 wherein the distance between said first face and said second face is approximately 10 cm.

14. A video system as set forth in claim 12 further comprising:

a second baffle including a plurality of spaced-apart second plates, each of said second plates having N columns of second slits in alignment with said second slits of each other of said second plates, a first end one of said second plates forming a first face of said second baffle and a second end one of said second plates forming a second face of said second baffle, said second baffle being disposed in said first propagation path wherein said beam splitter is disposed intermediate said second baffle and said source so that said optical energy of said first light beam illuminates said first face of said second baffle and passes through said second slits to exit from said second face of said second baffle as a plurality of second planar light beams; and an M×N array of second mirrors disposed in a facing relationship to said second race of said second baffle, each column of said second mirrors having an optically reflective surface in optical alignment with the respective one of said second slits in each of said second plates to reflect one of said second parallel light beams incident thereon through respective one of said second slits of each of said second plates to develop a plurality of second pixel light beams exiting said second slits from said first face of said second baffle along said first propagation path, each of said second mirrors being movable to perturb a respective one of said second pixel light beams propagating therefrom from alignment with said first propagation path to attenuate selectively said optical energy of said respective one of said second pixel light beams when propagating through said respective one of said second slits and each of said second plates, each of said second mirrors being moved commensurately with a respective one of said first mirrors so that said optical energy of each of said second pixel beams when incident on said beam splitter is split whereby a portion of said optical energy of each of said second pixel beams cumulatively combines with said optical energy of a respective one of said first pixel beams.

15. A video system as set forth in claim 14 wherein the distance between said first face of said second baffle and said second face of said second baffle is approximately 10 cm.

16. An optical modulation video system to display an image as an M×N array of pixels, said system comprising:

a source of optical energy to develop a first light beam along a first propagation path;

a first array of K columns of first slits disposed in said first propagation path to be illuminated by said first light beam, said first light beam exiting said first slits as a plurality of first quasi planar light beams;

a beam splitter disposed in said first propagation path and positioned to split said optical energy of said first quasi parallel light beams to develop a plurality of second quasi parallel light beams along a second propagation path;

a second array of K columns of second slits disposed in said second propagation path, said second array being positioned so that each of said second quasi planar light beams passes through a respective one of said slits;

a first M×N array of first mirrors disposed in said second propagation path, each column of said first mirrors having a reflective surface being uniformly illuminated by said second array of K columns of second slits, each of said mirrors being off normally positioned so that said first pixel beams are incident upon obfuscations corresponding to images of said second slits and further movable to perturb a respective one of said second slits to reflect one of said second planar beams incident thereon to develop a plurality of first pixel beams, each of said mirrors being off normally positioned so that said first pixel beams are incident upon an obfuscation adjacent said respective one of said second slits and further movable to perturb a respective one of said first pixel beams propagating therefrom so that a selected portion of said optical energy of said respective one of said first pixel beams passes through said respective one of said slits; and a screen disposed in said second propagation path and positioned wherein said beam splitter is disposed intermediate said screen and said second array of said second slits so that said pixel beams passing through said second array of second slits illuminates said screen to display said image.

17. A video system as set forth in claim 16 further comprising a collimating lens disposed intermediate said source and said first array of said first slits.

18. A video system as set forth in claim 16 further comprising:
   a lens disposed intermediate said first array of said first slits and said beam splitter.

19. A video system as set forth in claim 16 further comprising:
   a lens disposed in said second propagation path spaced from said first M×N array of said first mirrors.

20. A video system as set forth in claim 16 further comprising:
   a lens disposed in said second propagation path intermediate said screen and said beam splitter.

21. A video system as set forth in claim 16 further comprising:
   a third array of K columns of third slits disposed in said first propagation path wherein said beam splitter is disposed intermediate said first array of said first slits and said third array of said third slits, said third array of said third slits being positioned so that each of said first planar beams passes through a respective one of said third slits;
   a second M×N array of second mirrors disposed in said first propagation path, each column of said second mirrors having a reflective surface being uniformly illuminated by said third array of K columns of third slits, each of said second mirrors being off normally positioned so that said second pixel beams are incident upon obfuscations corresponding to images of said third slits and further movable to perturb a respective one of said second pixel beams propagating therefrom so that a selected portion of said optical energy of said respective one of said second pixel beams passes through said respective one of said third slits, each of said second mirrors being moved commensurate with a respective one of said first mirrors so that said optical energy of each of said second pixel beams when incident on said beam splitter is split whereby a portion of said optical energy of each of said second pixel beams cumulatively combines with said optical energy of a respective one of said first pixel beams.

22. A video system as set forth in claim 21 further comprising a lens disposed in said first propagation path adjacent said second array of said second mirrors.

23. An optical modulation video system to display an image as an M×N array of pixels, said system comprising:
   a source of optical energy;
   a first lens to collimate said optical energy along a first propagation path;
   a beam splitter disposed in said first propagation path and positioned to split a portion of said optical energy along a second propagation path;
   a first array of K columns of first slits disposed in said first optical path;
   a second array of K columns of second slits disposed in said second optical path;
   a second lens disposed in said first optical path intermediate said first array and said beam splitter and positioned to image each of said first slits into a respective one of said second slits;
   a first M×N array of first mirrors disposed in said second optical path wherein said second array of said second slits is intermediate said beam splitter and said first array of said mirrors, each of said mirrors having a reflective surface being uniformly illuminated by said second array of said second slits, said first array of mirrors being offset from orthogonal alignment with said second propagation path; and
   a third lens disposed in said second propagation path intermediate said second array of said second slits and said first array of said mirrors to image a reflection from each of said mirrors of said respective one of said second slits to an obfuscation immediately adjacent said respective one of said second slits, each of said mirrors being movable to image a selected portion of said reflection to said respective one of said second slits;
   a screen disposed in said second propagation path wherein said beam splitter is intermediate said screen and said second array of second slits; and
   a fourth lens disposed in said second propagation path intermediate said screen and said beam splitter to image said selected portion of said reflection to said screen.

24. A video system as set forth in claim 23 further comprising:
   a third array of K columns of third slits disposed in said first optical path wherein said beam splitter is intermediate said third array and said second lens;
   a second M×N array of second mirrors disposed in said first optical path wherein said third array is intermediate said second array of said second mirrors and said beam splitter, each of said second mirrors having a reflective surface being uniformly illuminated by said third array of said third slits, said second array of said second mirrors being offset from orthogonal alignment with said first propagation path; and
   a fifth lens disposed in said first propagation path intermediate said third array and said second array of said second mirrors to image a second reflection from each of said second mirrors of said respective one of said third slits to an obfuscation immediate adjacent said respective one of said third slits, each of said second mirrors being movable to image a selected portion or said second reflection to said respective one of said third slits, said fourth lens further being to image said selected portion of said second reflection to said screen, each of said first mirrors being movable commensurately with respective one of said second mirrors whereby said first reflection is cumulatively combined with said second reflection.

* * * * *